US009485788B2

(12) United States Patent
Bengtsson et al.

(10) Patent No.: US 9,485,788 B2
(45) Date of Patent: Nov. 1, 2016

(54) MASSIVE MIMO CELL SYNCHRONIZATION: AP TO AP DIRECT COMMUNICATION

(71) Applicant: Sony Corporation, Tokyo (JP)

(72) Inventors: Erik Bengtsson, Eslöv (SE); Kåre Agardh, Lund (SE); Vanja Plicanic Samuelsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 159 days.

(21) Appl. No.: 14/308,586

(22) Filed: Jun. 18, 2014

(65) Prior Publication Data

US 2015/0373746 A1    Dec. 24, 2015

(51) Int. Cl.
*H04W 4/00* (2009.01)
*H04W 76/02* (2009.01)
*H04W 56/00* (2009.01)
*H04L 5/00* (2006.01)
*H04L 5/14* (2006.01)

(52) U.S. Cl.
CPC ............ *H04W 76/02* (2013.01); *H04L 5/0048* (2013.01); *H04W 56/001* (2013.01); *H04L 5/005* (2013.01); *H04L 5/0035* (2013.01); *H04L 5/1469* (2013.01)

(58) Field of Classification Search
CPC ...... H04L 5/00; H04L 5/0048; H04W 56/00; H04W 56/001; H04W 76/02
USPC ........................................ 370/329, 336, 337
See application file for complete search history.

(56) References Cited

U.S. PATENT DOCUMENTS

| 6,295,290 | B1 | 9/2001 | Soderkvist et al. |
| 8,774,150 | B1 | 7/2014 | Jeffery et al. |
| 2002/0004920 | A1 | 1/2002 | Cho et al. |
| 2004/0131030 | A1* | 7/2004 | Kuroyanagi ............ H04J 13/00 370/335 |
| 2006/0256761 | A1* | 11/2006 | Meylan ................ H04B 7/0417 370/338 |
| 2007/0082619 | A1* | 4/2007 | Zhang ................ H04W 52/143 455/69 |

(Continued)

FOREIGN PATENT DOCUMENTS

| WO | 2008111781 A1 | 9/2008 |
| WO | 2011131822 A1 | 10/2011 |

(Continued)

OTHER PUBLICATIONS

Boris Kouassi et al., "Design and Implementation of Spatial Interweave LTE-TDD Cognitive Radio Communication on an Experimental Platform", IEEE Wireless Communications, IEEE Service Center, Piscataway, NJ, US, vol. 20, No. 2, Apr. 1, 2013, pp. 60-67, XP011505963.

(Continued)

*Primary Examiner* — Farah Faroul
(74) *Attorney, Agent, or Firm* — James C. Edwards; Moore & Van Allen PLLC

(57) ABSTRACT

The invention is directed to synchronizing a massive multiple-input multiple-output (MIMO) link between an access point (AP) and a contaminating AP. An exemplary method comprises: detecting, by an AP, a contaminating AP, wherein the contaminating AP interferes with communication between the AP and other UEs in communication with the AP; and extracting, by the AP, broadcasted pilot information from a first channel associated with a data frame, wherein the broadcasted pilot information is associated with the contaminating AP.

15 Claims, 10 Drawing Sheets

(56) References Cited

U.S. PATENT DOCUMENTS

| | | | |
|---|---|---|---|
| 2007/0207828 A1* | 9/2007 | Cheng | H04W 16/04 455/522 |
| 2008/0220791 A1 | 9/2008 | Cho et al. | |
| 2008/0298524 A1* | 12/2008 | Koorapaty | H04L 25/0228 375/348 |
| 2009/0130980 A1* | 5/2009 | Palanki | H04W 52/241 455/63.1 |
| 2009/0154540 A1* | 6/2009 | Yu | H04L 25/0244 375/227 |
| 2009/0180435 A1 | 7/2009 | Sarkar | |
| 2009/0268679 A1* | 10/2009 | Suga | H04L 5/0007 370/329 |
| 2010/0151873 A1 | 6/2010 | Gorokhov et al. | |
| 2010/0234061 A1 | 9/2010 | Khandekar et al. | |
| 2010/0272032 A1* | 10/2010 | Sayana | H04B 7/024 370/329 |
| 2010/0311450 A1 | 12/2010 | Rinne et al. | |
| 2010/0322100 A1 | 12/2010 | Wan et al. | |
| 2011/0280223 A1 | 11/2011 | Maeda et al. | |
| 2013/0100823 A1 | 4/2013 | Ren et al. | |
| 2013/0201967 A1 | 8/2013 | Nentwig | |
| 2013/0265896 A1 | 10/2013 | Mallik et al. | |
| 2013/0294268 A1 | 11/2013 | Xu et al. | |
| 2014/0098704 A1* | 4/2014 | Wang | H04L 25/0212 370/254 |
| 2015/0103711 A1 | 4/2015 | Hong et al. | |
| 2016/0029429 A1 | 1/2016 | Peng et al. | |

FOREIGN PATENT DOCUMENTS

| | | |
|---|---|---|
| WO | 2013116762 A1 | 8/2013 |
| WO | 2013165282 A1 | 11/2013 |

OTHER PUBLICATIONS

R. Rogalin et al., "Scalable Synchronization and Reciprocity Calibration for Distributed Multiuser MIMO", IEEE Transactions on Wireless Communications, IEEE Service Center, Piscataway, NJ, US, vol. 13, No. 4, Apr. 1, 2014, pp. 1815-1831, XP011546291.

Erik Larsson et al., "Massive MIMO for Next Generation Wireless Systems", IEEE Communications Magazine, IEEE Service Center, Piscataway, US, vol. 52, No. 2, Feb. 1, 2014, pp. 186-195 XP011539689.

International Search Report and Written Opinion; Feb. 27, 2015; issued in International Patent Application No. PCT/EP2014/077965.

International Search Report and Written Opinion; Oct. 7, 2015; issued in International Patent Application No. PCT/EP2015/063737.

International Search Report and Written Opinion; Mar. 4, 2015; issued in International Patent Application No. PCT/EP2014/077962.

* cited by examiner

MASSIVE MIMO CELL SYNCHRONIZATION: AP TO AP DIRECT COMMUNICATION

BACKGROUND

Multiple-input and multiple-output ("MIMO") is the use of multiple antennas at both a transmitter (e.g., an access point "AP" and/or user equipment "UE") and a receiver (e.g., an AP and/or UE) in order to improve wireless communication between the transmitter and the receiver. Massive MIMO refers to using a large number of antennas (e.g., equal to or greater than a threshold number) at at least one of the transmitter and receiver. The large number of antennas may be arranged in an antenna array. Massive MIMO enables realization of high spectral efficiencies. One of the issues with massive MIMO is the synchronization between neighboring cells. The present invention is directed to addressing this issue.

BRIEF SUMMARY

Embodiments of the invention are directed to a system, method, and computer program product for establishing a channel between an access point (AP) and a contaminating user equipment (UE). An exemplary method comprises: detecting, by an AP, a contaminating UE, wherein the contaminating UE interferes with communication between the AP and other UEs in communication with the AP; and transmitting, by the AP, a message to the contaminating UE on a first channel associated with a data frame, wherein the data frame comprises a downlink (DL) part, an uplink (UL) part, and a header.

In some embodiments, the channel is provided on the DL part.

In some embodiments, the first channel comprises a first dedicated channel. As used herein, a "dedicated" channel refers to a channel being used for a particular purpose or function. For example, the dedicated channel is a timeslot that does not carry payload. In one embodiment, "dedicated" includes the channel being used only for that particular purpose or function. In other embodiments, "dedicated" may include where the channel is used for a particular purpose or function along with one or more other purposes or functions.

In some embodiments, the first channel enables one-way communication from the AP to the UE.

In some embodiments, the method further comprises receiving, by the AP, a message from the contaminating UE on a second channel provided on the UL part of the data frame.

In some embodiments, the second channel comprises a second dedicated channel.

In some embodiments, the second channel enables two-way communication between the UE and the AP.

In some embodiments, the contaminating UE is connected to a second AP.

In some embodiments, the method further comprises communicating from the AP to the second AP via the contaminating UE.

In some embodiments, the AP and the second AP attempt to simultaneously synchronize via the contaminating UE.

In some embodiments, the contaminating UE is a clock reference in a cell associated with the second AP or the AP.

In some embodiments, the message instructs the contaminating UE to synchronize with the AP.

In some embodiments, the first channel is not provided on every data frame.

In some embodiments, the first channel is provided every certain number of data frames.

In some embodiments, a second UE is connected to the AP, and wherein synchronized communication between the contaminating UE and the AP is based on a direct connection between the second UE and the contaminating UE.

In some embodiments, when a UE detects interference on the DL part, the UE uses the first channel for contacting a second UE, and the AP sanctions a synchronization channel from the AP to the UE, then to the second UE, and then to a second AP associated with the second UE.

In some embodiments, a computer program product is provided for performing the various methods described herein. A computer program product comprises a non-transitory computer-readable medium comprising code configured to perform the various methods described herein.

In some embodiments, an apparatus is provided for performing the various methods described herein. An apparatus comprises a memory; a processor; a module, stored in the memory, executable by the processor, and configured to perform the various process described herein. For example, an access point (AP) is provided for establishing a massive multiple-input multiple-output (MIMO) link between the AP and a UE. The AP comprises a memory; a processor; a module, stored in the memory, executable by the processor, and configured to: detect a contaminating UE, wherein the contaminating UE interferes with communication between the AP and other UEs in communication with the AP; and transmit a message to the contaminating UE on a first channel associated with a data frame, wherein the data frame comprises a downlink (DL) part, an uplink (UL) part, and a header.

Further embodiments of the invention are directed to a system, method, and computer program product for synchronizing a massive multiple-input multiple-output (MIMO) link between an access point (AP) and a contaminating AP, the method comprising detecting, by an AP, a contaminating AP, wherein the contaminating AP interferes with communication between the AP and other UEs in communication with the AP; and extracting, by the AP, broadcasted pilot information from a first channel associated with a data frame.

In some embodiments, the first channel is a first dedicated channel.

In some embodiments, the first channel is provided on a downlink (DL) part of a data frame, wherein the frame comprises the DL part, an uplink (UL) part, and a header.

In some embodiments, the broadcasted pilot information is associated with a predetermined standard.

In some embodiments, the broadcasted pilot information is broadcasted every certain number of data frames.

In some embodiments, the broadcasted pilot information is not broadcasted on every data frame.

In some embodiments, the method further comprises providing a second channel for the contaminating AP to initiate communication with the AP.

In some embodiments, the second channel comprises a second dedicated channel.

In some embodiments, the contaminating AP acts as a UE when communicating with the AP.

In some embodiments, a computer program product is provided for performing the various methods described herein. A computer program product comprises a non-transitory computer-readable medium comprising code configured to perform the various methods described herein.

In some embodiments, an apparatus is provided for performing the various methods described herein. An apparatus comprises a memory; a processor; a module, stored in the memory, executable by the processor, and configured to perform the various process described herein. For example, an access point (AP) is provided for establishing a massive multiple-input multiple-output (MIMO) link between the AP and another AP. The AP comprises a memory; a processor; a module, stored in the memory, executable by the processor, and configured to: detect a contaminating AP, wherein the contaminating AP interferes with communication between the AP and other UEs in communication with the AP; and extract, by the AP, broadcasted pilot information from a first channel associated with a data frame.

BRIEF DESCRIPTION OF THE DRAWINGS

Figure 1:
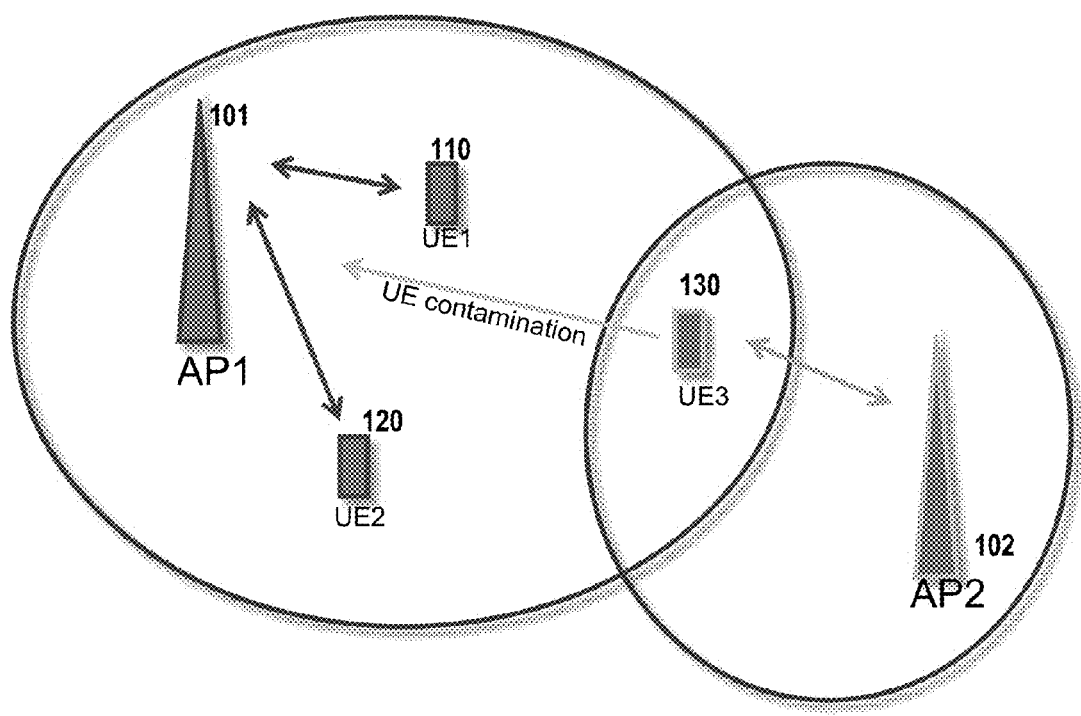
Figure 2:
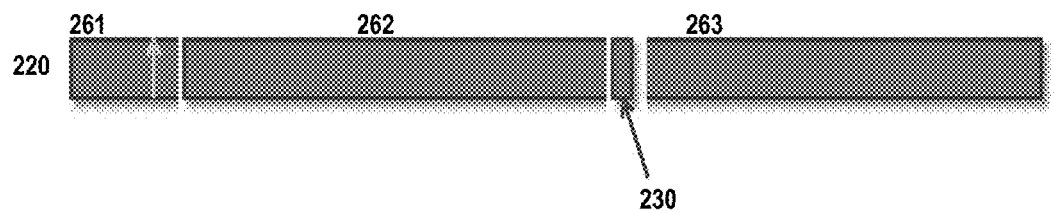
Figure 3:
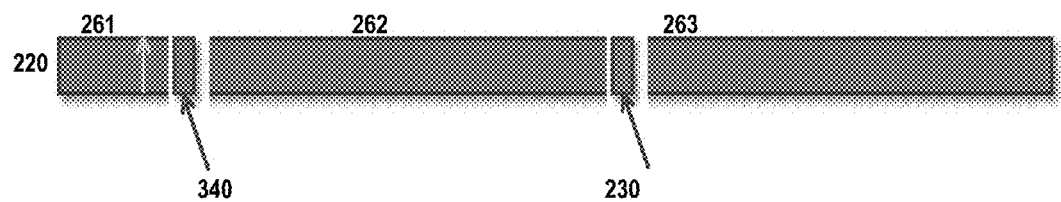
Figure 4:
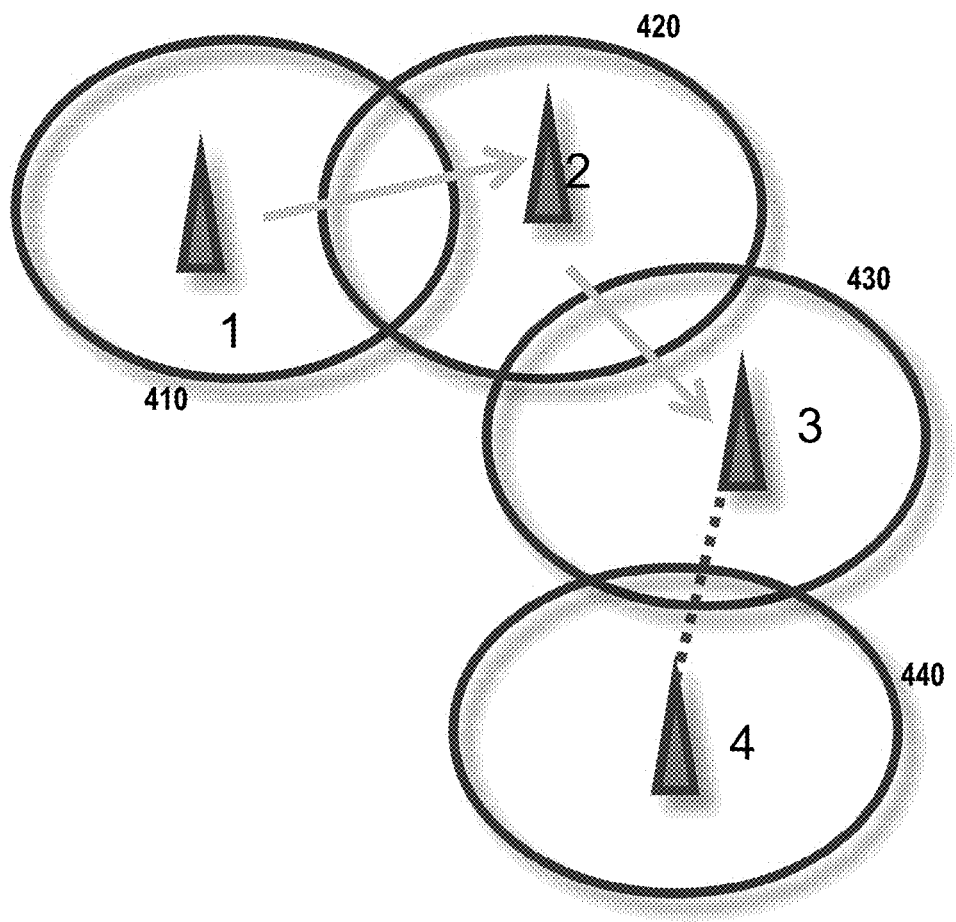
Figure 5:
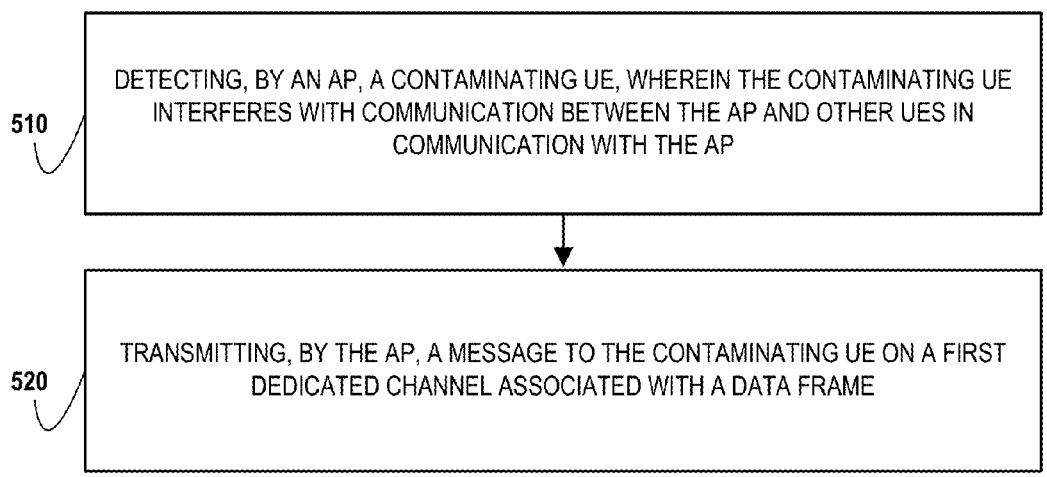
Figure 6:
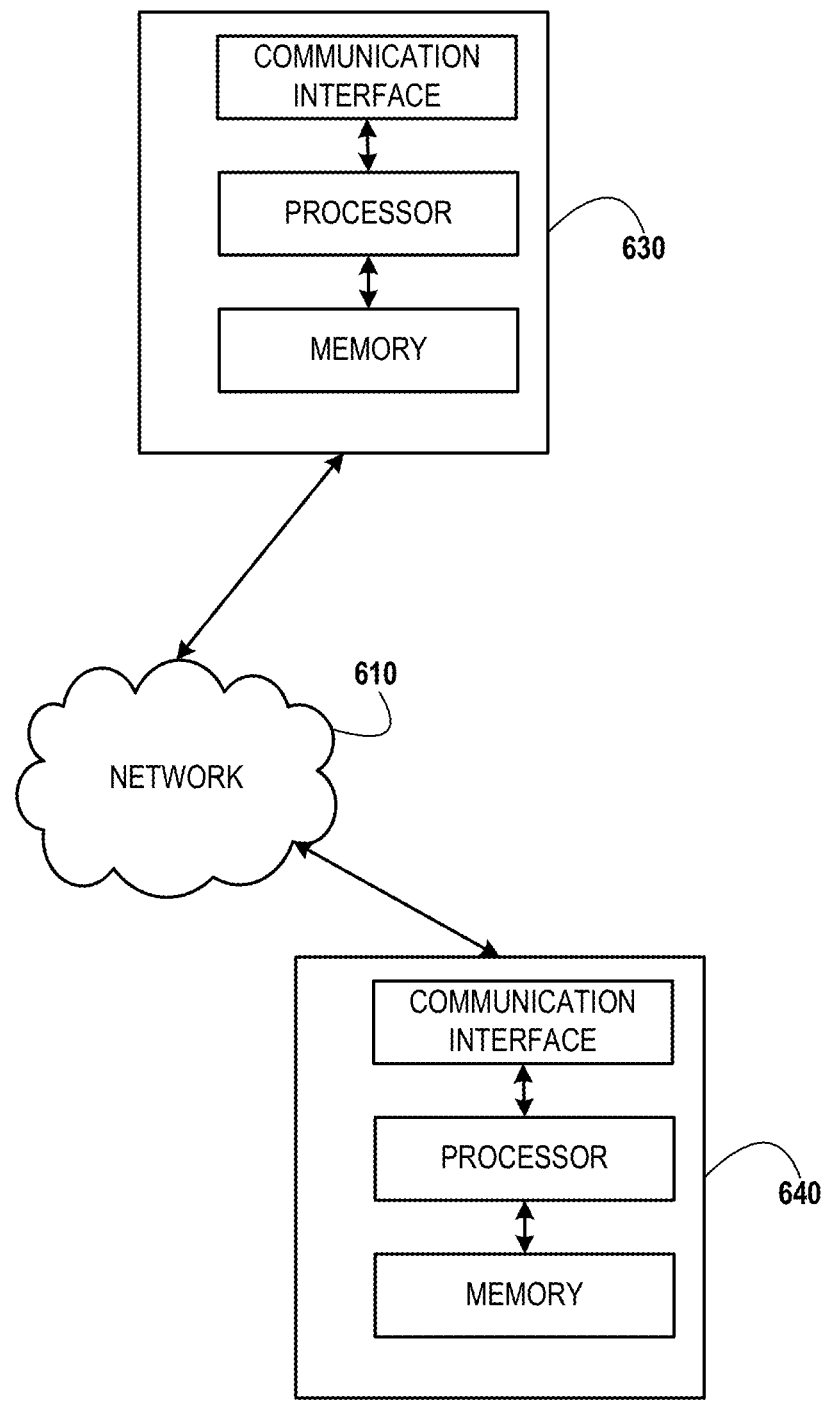
Figure 7:
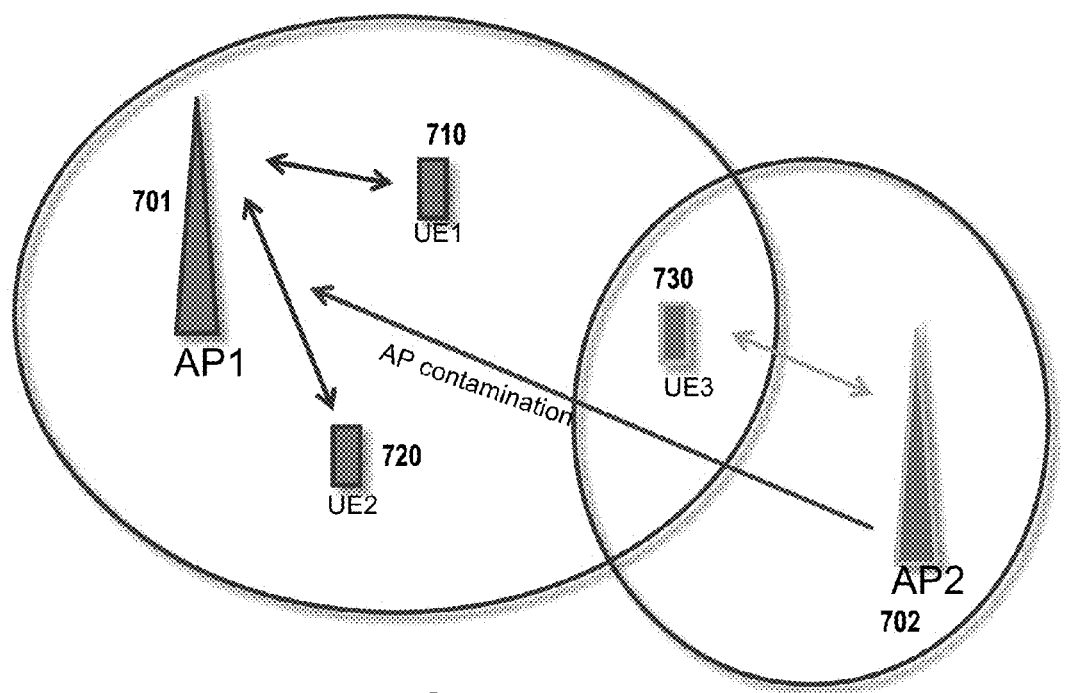
Figure 8:
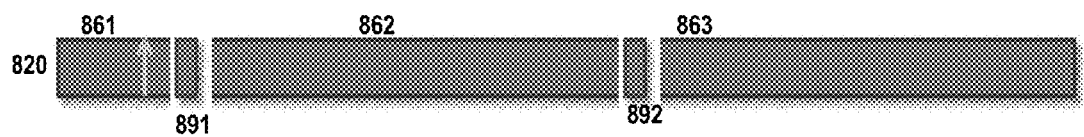
Figure 9:
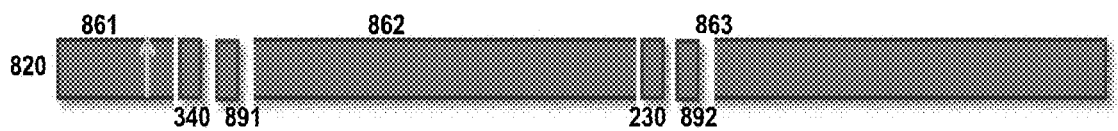
Figure 10:
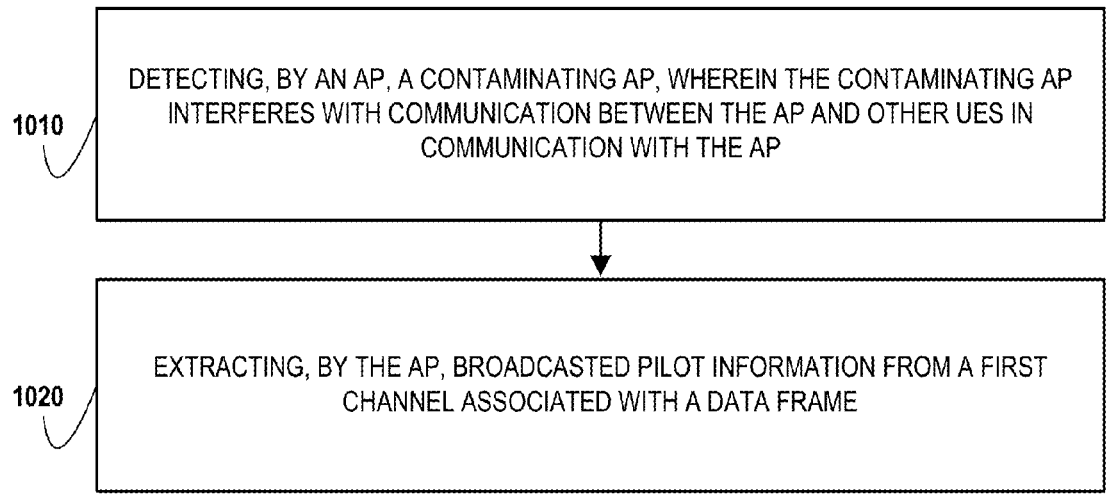

Having thus described embodiments of the invention in general terms, reference will now be made to the accompanying drawings, where:

FIG. 1 illustrates an exemplary network environment, in accordance with embodiments of the present invention;

FIG. 2 illustrates an exemplary data frame, in accordance with embodiments of the present invention;

FIG. 3 illustrates another exemplary data frame, in accordance with embodiments of the present invention;

FIG. 4 illustrates another exemplary network environment, in accordance with embodiments of the present invention;

FIG. 5 illustrates an exemplary method, in accordance with embodiments of the present invention;

FIG. 6 illustrates another exemplary network environment, in accordance with embodiments of the present invention;

FIG. 7 illustrates another exemplary network environment, in accordance with embodiments of the present invention;

FIG. 8 illustrates another exemplary data frame, in accordance with embodiments of the present invention;

FIG. 9 illustrates another exemplary data frame, in accordance with embodiments of the present invention; and FIG. 10 illustrates another exemplary method, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A network may be based on one or more network topologies. In an infrastructure topology, a network comprises a central device (an access point or "AP") and one or more connected devices (user equipment or "UE") that communicate with the AP and communicate with other connected devices via the AP. The AP may also be referred to as a base station or include a base station. In other embodiments, the network may be based on other network topologies, such as a peer-to-peer ("P2P") topology or a mesh network topology. This invention is not limited to any particular network topologies. Briefly, the present invention is directed to assigning a channel in the downlink ("DL") payload part of data frame to enable AP to UE communication and/or synchronization. In some embodiments, the present invention is directed to AP to AP synchronization based on indirect communication between the APs via UEs connected to the APs. In other embodiments, the present invention is directed to AP to AP synchronization based on direct communication between the APs. Any features described in this specification may be applicable to any embodiments described herein. The synchronization associated with the AP and/or the UE described herein may also be referred to as cell synchronization. Synchronized communication refers to an instance when the header, uplink ("UL") pattern, and DL pattern comprised in the frame pattern is substantially synchronous with or overlaps the header, UL pattern, and DL pattern comprised in the frame pattern.

One of the issues with massive MIMO is the setup of a link between the AP and the UE. An issue is that the AP is not able to utilize the antenna gain offered by the antenna array of the AP unless information (e.g., CSI) of the transmission channel between the UE and the AP is determined based on a pilot training sequence (or just pilot). It is important that this pilot is transmitted substantially synchronously with a data frame from the UE to the AP. Hence, in order to not contaminate or to be contaminated by a data signal from other UEs, the pilot needs to be transmitted on a channel from the UE when other UEs are not transmitting on the same channel (e.g., when other UEs are silent). A UE needs its own channel for transmitting the pilot to the AP. The UE will not be able to communicate with the AP, and the AP will not be able to communicate with the UE, without this pilot being transmitted from the UE to the AP. If other UEs are transmitting on the same channel as the pilot being transmitted from the UE for the purpose of channel estimation, this situation is referred to as pilot contamination.

In licensed frequency bands, the problem of pilot contamination can be solved to some extent by enabling AP synchronization over the network backhaul. However, an AP described herein may be deployed in a non-licensed band where backhaul synchronization of an AP is more complicated. There is a need to synchronize an AP without communication between the AP and another AP. Hence, the present invention is directed to synchronizing two cells with each other, wherein each cell is associated with a different AP.

The present invention can be enabled if two APs are not in range to communicate with each other. Additionally, the present invention proposes a method to synchronize the APs without adding an additional orthogonalization dimension associated with communication in the network, which would add a huge cost on the throughput of the network. Synchronization, as proposed by the present invention, requires only that the headers associated with data frames be orthogonal. The present invention can be used in conjunction with various synchronization protocols, and is not limited to any particular synchronization protocols. An assumption is that the massive MIMO system described herein is run in a defined frequency band and that the contamination originates from UEs running the same protocol as the UE under consideration or a known protocol, but are connected to an AP different from the AP that the UE under consideration is attempting to communicate with.

The present invention is directed to resolving several different use cases associated with neighboring first and second cells. For example, a UE associated with a second cell contaminates pilot transmission associated with an AP of the first cell. As a further example, a UE associated with a second cell transmits during the DL phase of a first cell, which may cause blocking of communication between the UE of the first cell and the AP of the first cell. As a further example, an AP associated with a second cell interferes with the pilot transmission associated with an AP of the first cell. As a further example, an AP associated with a second cell interferes with a UE associated with a first cell. Referring now to FIG. 1, FIG. 1 illustrates a situation where AP1 101 experiences or detects contamination while communicating with UE1 110 or UE2 120. The data frames associated with communication between AP1 101 and UE1 110/UE2 120 are not synchronized with UE3 130 and AP2 102 and hence UE3 130 contaminates the pilot time channel associated with AP1 101. In some embodiments, UE1 110 and UE2 120 are already synchronized with AP1 101 at the time of contamination from UE3 130.

UE3 130 is detected by AP1 101, and then AP1 101 might decide to synchronize with or connect to UE3 130 for more advanced synchronization by possibly indirectly communicating with AP2 102 via UE3 130. In the example in FIG. 1, synchronization might be continuous as long as contamination (or the contaminating UE) is detected by AP1 101. The contamination may lead to poor performance of AP1 101. For example, the poor performance may be related to low signal-to-noise ratio (SNR), high bit error rate (BER), adverse channel conditions, etc. As used herein, a contaminating (or interfering) UE may also refer to a contaminating (or interfering) AP or cell associated with the contaminating (or interfering) UE.

In a standard network cell environment, APs cannot easily connect to each other as they use array antennas. Additionally, an AP can only transmit to a UE connected to it and does not need to respond to UEs not known to the AP. Additionally, UEs can hear each other when they are within a certain distance from each other as they might have omni-directional antenna behavior. Therefore, an AP may interfere with a neighbor cell comprising at least one of an AP and/or a UE. Additionally, an AP can hear or detect UEs within its coverage area even though those UEs they are connected to a different AP. This situation is referred to as pilot contamination.

Referring now to FIG. 2, the present invention proposes introduction of a communication channel where each UE listens for other APs and is able to set up a simultaneous channel for synchronization purposes. FIG. 2 illustrates a frame pattern 220 comprising a header 261, a UL payload (or part or frame pattern) 262, and a DL payload (or frame pattern) 263. The present invention enables an AP to send short messages (e.g., messages smaller than a certain data amount or length) to an interfering foreign UE (e.g., a UE connected to a different AP). The present invention adds a small channel 230 in the DL payload 263 where the UE listens for synchronization messages from other APs. In other embodiments, the channel 230 is presented next to the DL payload 263. The channel may not be present in every frame, and may be periodically introduced every certain number of data frames. Therefore, as a part of the DL part 263 of the frame when the UE is in receive mode, a small channel 230 is assigned for AP to UE communication. In some embodiments, the present invention is limited to one-way communication from the AP to the UE. In some embodiments, the channel 230 might be used (e.g., by the contaminated AP such as AP1 101 in FIG. 1) to instruct the UE to set up a link to the AP.

Referring now to FIG. 3, FIG. 3 illustrates an embodiment for two-way communication between the AP and the UE. FIG. 3 is similar to FIG. 2 except for channel 340 in the UL payload (or part or data frame pattern) 262 of the frame pattern 220. FIG. 3 indicates that an assigned channel 340 in the UL payload 262 of the data frame might be introduced if two-way communication is needed. In other embodiments, the channel 340 is presented next to the UL payload 262. The channel may not be present in every frame, and may be periodically introduced every certain number of data frames. Whether one-way or two-way communication is needed between the AP and the UE may be based on the type of synchronization that is required. Therefore, the UL 340 and DL 230 channels described herein enable cell synchronization (e.g., synchronization between the AP and UE). The synchronization is a continuous process and the communication between the AP and the contaminating UE will go on for as long as they are in contact with each other.

Referring now to FIG. 4, FIG. 4 illustrates an exemplary network environment. Cells 1 410, 2 420, and 3 430 may be synchronized. As used herein, a cell comprises an AP and/or a UE. However, cell 3 430 may detect contaminating cell 4 440. If cell 4 440 successfully synchronizes with cell 3 430, cell 3 430, which was previously synchronized with cell 2 420, will now synchronize with cell 4 440. Then, cell 2 420 contaminates cell 3 430, and attempts to synchronize with cell 3 430. Therefore, cell 2 420 and cell 4 440 may toggle back and forth over synchronizing with cell 3 430. Since the present invention enables a UE to be simultaneously connected to a first AP (the "home" AP) and neighboring AP, the UE can act as a communication and/or synchronization bridge between the home AP and the neighboring AP. Therefore, a UE associated with cell 3 430 can act as a synchronization bridge between an AP associated with cell 2 420 and an AP associated with cell 4 440.

In some embodiments of the present invention, synchronization is assumed to be continuous. If a UE is detected by the AP, the AP continuously listens to pilots (synchronization) transmitted from the UE and synchronizes to the UE, or the AP transmits a synchronization request to the UE. If the UE associated with a first cell receives a synchronization request from a neighboring second cell (comprising an AP), the UE is considered as the clock reference within its own cell (i.e., the first cell). The chance of either event happening is 50%; therefore, the AP randomly decides whether to synchronize the UE or be synchronized by the UE. The UE described herein may also be referred to as a contaminating UE.

In some embodiments, a first UE that is connected to a first AP might experience interference from a second UE connected to a second AP. The present invention provides for the first UE to directly contact the second UE and arrange for synchronized communication between both UEs (or between one of the UEs and one of the APs or between both APs) that is sanctioned by both APs (or at least one of the first AP or the second AP). The synchronization reference might come from the first UE and the second UE being connected to each other (i.e., the first AP and the second AP being indirectly connected to each other via the UEs).

Referring now to FIG. 5, FIG. 5 illustrates an exemplary method for synchronizing a massive MIMO link between an AP and a contaminating UE. At block 510, the method comprises detecting, by an AP, a contaminating UE, wherein the contaminating UE interferes with communication between the AP and other UEs in communication with the AP. At block 520, the method comprises transmitting, by the AP, a message to the contaminating UE on a first channel associated with or provided on a data frame (e.g., a DL part of a data frame), wherein the data frame comprises the DL part, an UL part, and a header. As used herein, a message may refer to any type of information. Information may also be referred to as data. The first channel enables one-way communication from the AP to the UE. In some embodiments, the other UEs have been synchronized with the AP prior to detecting the contaminating UE. In other embodiments, other UEs have been synchronized with the AP prior to detecting the contaminating UE.

The method further comprises receiving, by the AP, a message from the contaminating UE on a second channel provided on the UL part of the data frame. The second channel enables two-way communication between the UE and the AP. Therefore, in some embodiments, in response to the transmission from the AP, the contaminating UE transmits a message to the AP on a second channel provided on the UL part of the data frame.

In some embodiments, the contaminating UE is synchronized via a second AP. The method enables communicating from the AP to the second AP via the contaminating UE. The AP and the second AP attempt to simultaneously synchronize with the contaminating UE. The contaminating UE is a clock reference in a cell associated with the second AP.

In some embodiments, the message instructs the contaminating UE to synchronize with the AP. In some embodiments, the first channel (and/or the second channel) is not provided on every data frame. Instead, the first channel (and/or the second channel) is provided every certain number of data frames. In some embodiments, a second UE is connected to the AP, and wherein synchronized communication between the contaminating UE and the AP is based on a direct connection between the second UE and the contaminating UE.

As used herein, traffic refers to data traffic on a communication channel or data channel. As used herein, a data frame or frame is a data transmission unit. The data frame may or may not include a frame synchronization sequence, i.e., a sequence of bits that indicates to the receiver the beginning and/or end of the data frame. As used herein, a data frame may be referred to as a data packet, data signal, data stream, data traffic, frame pattern, frame, data, traffic, or signal. In some embodiments, time division duplexing ("TDD") is used to separate the UL and DL data frames. Therefore, a data frame as described herein may be a TDD data frame.

In a network system as described herein, channel state information ("CSI") refers to channel properties (e.g., scattering, fading, power decaying, etc.) of a communication channel associated with an AP. If a UE wants to estimate the CSI of a communication channel, the UE transmits a data frame comprising a pilot training sequence into the channel. A data frame comprising a pilot training sequence may simply be referred to as a pilot data frame, pilot frame, or just pilot.

The invention is not limited to any particular types of systems or devices that can take the form of the AP and/or the UE. As used herein, a device may also be referred to as a system or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, servers, routers, sensors, Internet of Things (IOTs), non-computing devices or systems, etc.

Referring now to FIG. 6, FIG. 6 illustrates an exemplary block diagram of the network environment for the various methods described herein, in accordance with embodiments of the present invention. As illustrated, the network environment includes a network 610, an AP 630, and a UE 640.

As shown in FIG. 6, the AP 630 and the UE 640 are each operatively and selectively connected (e.g., via one or more wired or wireless mechanisms) to the network 610, which may include one or more separate networks.

Each of the AP 630 and the UE 640 is a computing device that comprises a communication interface, a processor, a memory, and a module stored in the memory, executable by the processor, and configured to perform the various processes described herein. Each communication interface described herein enables communication with other systems via the network 610.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system (e.g., first device or second device) in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In further embodiments of the invention, synchronization between APs is achieved based on direct communication between the APs. Referring now to FIG. 7, FIG. 7 illustrates a situation where AP1 701 experiences or detects contamination while communicating with UE1 710 or UE2 720. The data frames associated with communication between AP1 701 and UE1 710/UE2 720 are not synchronized with AP2 702 and hence AP2 702 contaminates the pilot time channel associated with AP1 701. In some embodiments, UE1 710 and UE2 720 are already connected to AP1 701 at the time of contamination from AP2 702. AP2 702 is detected by AP1 701, and then AP1 701 might establish a communication channel with AP2 702. Alternatively or additionally, AP1 701 may also directly synchronize with data frames associated with AP2 702.

Referring now to FIG. 8, the present invention proposes introduction, in a data frame, of at least one communication channel that enables an AP to directly communicate with a contaminating AP (and synchronize with the contaminating AP) in the event of the AP detecting interference in the AP's communication with UEs connected to the AP. FIG. 8 illustrates a frame pattern 820 comprising a header 861, a UL payload (or frame pattern) 862, and a DL payload (or frame pattern) 863. As indicated in FIG. 8, the UL payload 862 comprises an AP synchronization channel 891. In other embodiments, the channel 891 is provided next to (or within) the UL payload 862. This channel enables the AP to listen for synchronization messages from other APs that are in range. Additionally or alternatively, an AP pilot channel 892 may be provided in the DL payload 863 or next to the DL payload 863. This channel can be used by the AP to send pilots to other APs in range. The channels described herein enable synchronization and interference mitigation. When an AP detects a contaminating AP, the AP opens up a communication channel comprising data frames with the channels described herein. The AP is then able to communicate with the contaminating AP in order to synchronize with the contaminating AP.

The channels described herein are smaller compared to the payloads in which they are located. Any of the channels described herein may not be present in every frame, and may be periodically introduced every certain number of data frames. Additionally, any of the channels described herein may be able to carry upto a certain maximum amount of information. In some embodiments, the channel 891 and the channel 892 may be associated with different maximum information amounts.

Therefore, as an example, if an AP is contaminated by a neighbor AP, the AP is able to listen for a synchronization message from the neighbor AP by reading the AP synchronization channel in the DL payload frame, and is then able to configure its antenna array towards the neighbor AP. The AP can then act as a UE and set up a direct communication channel with the neighbor AP.

Therefore, the channels described in FIGS. 2 and 3 are directed to enabling communication and synchronization between an AP and a contaminating UE. The channels described in FIGS. 2 and 3 are associated with a frame pattern. The channels described in FIG. 8 are directed to enabling communication and synchronization between an AP and a contaminating AP. The channels described in FIG. 8 are associated with a frame pattern. While the channels described in FIGS. 2 and 3 have a different function from the channels described in FIG. 8, the corresponding frame pattern channels of FIGS. 2 and 3 may be included with the channels of FIG. 8 on the same data frame.

Referring now to FIG. 9, FIG. 9 presents a data frame that enables both direct communication with an AP and indirect communication with an AP (via an interfering UE). Channels 891 and 892 refer to the AP synchronization channel and the AP pilot channel, respectively. Channels 340 and 230 are channels associated with the UL and DL channels presented in FIG. 3. The placement of the channels in the DL or UL payload is for exemplary purposes only. While FIG. 9 shows that the channel 230 is placed to the left of channel 892, in other embodiments, the channel 892 is placed to the left of channel 230. In some embodiments, channel 230 and channel 892 (or channel 340 and channel 891) may be comprised in a single channel. This single channel may be used for both functions described herein, i.e., direct and indirect communication between APs.

Referring now to FIG. 10, FIG. 10 illustrates an exemplary method for synchronizing a massive MIMO link between an AP and a contaminating AP. At block 1010, the method comprises detecting, by an AP, a contaminating AP, wherein the contaminating AP interferes with communication between the AP and other UEs in communication with the AP. An AP (e.g., the contaminating AP) occasionally transmits a pilot in the DL part of the data frame. If the AP is able is read a pilot associated with a neighboring contaminating AP, the AP is able to configure its antenna and establish contact with the contaminating AP by sending a message to the contaminating AP in the UL part of the data frame, or alternatively act as a UE. In the latter case, the channel in the UL part of the data frame is not required.

At block 1020, the method comprises extracting, by the AP, broadcasted pilot information from a first channel (e.g., first dedicated channel) provided on a DL part of a data frame, wherein the frame comprises the DL part, an uplink (UL) part, and a header. In some embodiments, the method further comprises providing a second channel (e.g., second dedicated channel) for the contaminating AP to initiate communication with the AP.

The broadcasted pilot information may be associated with a predetermined standard. The broadcasted pilot information may be broadcasted every certain number of data frames (i.e., not broadcasted on every data frame). In some embodiments, the contaminated AP acts as a UE when communicating with the AP. Therefore, the channel in the DL part of the data frame comprises a pilot which enables other APs to configure their antennas for communication. The other APs can either act as UEs, or they might send a message in a channel (e.g., a dedicated channel) in the UL part of the data frame. The description herein serves to illustrate some embodiments of the present invention. The description herein can be easily extended to other schemes as well.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for synchronizing a massive multiple-input multiple-output (MIMO) link between an access point (AP) and a contaminating AP, the method comprising:
   detecting, by an AP, a contaminating AP, wherein the contaminating AP interferes with communication between the AP and other UEs in communication with the AP; and
   extracting, by the AP, broadcasted pilot information from a first channel provided on a downlink part of a data frame, wherein the broadcasted pilot information is associated with the contaminating AP, wherein the first channel enables the AP to directly communicate and synchronize with the contaminating AP via the direct communication.

2. The method of claim 1, wherein the first channel is a first dedicated channel.

3. The method of claim 1, wherein the data frame comprises the DL part, an uplink (UL) part, and a header.

4. The method of claim 1, wherein the broadcasted pilot information is broadcasted every certain number of data frames.

5. The method of claim 1, wherein the broadcasted pilot information is not broadcasted on every data frame.

6. The method of claim 1, further comprising providing a second channel for the contaminating AP to initiate communication with the AP.

7. The method of claim 6, wherein the second channel comprises a second dedicated channel.

8. An access point (AP) for establishing a massive multiple-input multiple-output (MIMO) link between the AP and a contaminating AP, the AP comprising:
   a memory;
   a processor;
   a module, stored in the memory, executable by the processor, and configured to:
      detect a contaminating AP, wherein the contaminating AP interferes with communication between the AP and other UEs in communication with the AP; and
      extract, by the AP, broadcasted pilot information from a first channel provided on a downlink part of a data frame, wherein the broadcasted pilot information is associated with the contaminating AP, wherein the first channel enables the AP to directly communicate and synchronize with the contaminating AP via the direct communication.

9. The AP of claim 8, wherein the first channel is a first dedicated channel.

10. The AP of claim 8, wherein the data frame comprises the DL part, an uplink (UL) part, and a header.

11. The AP of claim 8, wherein the broadcasted pilot information is broadcasted every certain number of data frames.

12. A computer program product for establishing a massive multiple-input multiple-output (MIMO) link between an AP and a contaminating AP, the computer program product comprising a non-transitory computer-readable medium configured to:
   detect a contaminating AP, wherein the contaminating AP interferes with communication between an AP and other UEs in communication with the AP; and
   extract, by the AP, broadcasted pilot information from a first channel provided on a downlink part of a data frame, wherein the broadcasted pilot information is associated with the contaminating AP, wherein the first channel enables the AP to directly communicate and synchronize with the contaminating AP via the direct communication.

13. The computer program product of claim 12, wherein the first channel is a first dedicated channel.

14. The computer program product of claim 12, wherein the data frame comprises the DL part, an uplink (UL) part, and a header.

15. The computer program product of claim 12, wherein the broadcasted pilot information is broadcasted every certain number of data frames.

* * * * *